United States Patent [19]

Roussel

[11] Patent Number: 5,118,418
[45] Date of Patent: Jun. 2, 1992

[54] ROTARY MULTI-PORT PLATTER VALVE AND FILTER ASSEMBLY

[75] Inventor: Jeffrey A. Roussel, Little Rock, Ark.

[73] Assignee: Jacuzzi Inc., Walnut Creek, Calif.

[21] Appl. No.: 683,250

[22] Filed: Apr. 10, 1991

[51] Int. Cl.⁵ .............................................. B01D 24/46
[52] U.S. Cl. ............................ 210/278; 210/425; 137/625.46
[58] Field of Search .............................. 210/278, 425; 137/625.46, 549

[56] References Cited

U.S. PATENT DOCUMENTS

| Re. 24,055 | 8/1955 | Daniels | 210/24 |
| Re. 30,224 | 3/1980 | Ortega | 137/625.47 |
| 37,786 | 2/1863 | Guernsey | 137/625.46 |
| 3,590,872 | 7/1971 | Balty | 137/625.46 |
| 3,809,247 | 5/1974 | Brett | 210/278 |
| 4,328,833 | 5/1982 | Aurther | 137/625.47 |
| 4,371,003 | 2/1983 | Goguen | 137/625.46 |
| 4,414,109 | 11/1983 | Aurthur | 210/278 |
| 4,679,983 | 7/1987 | Pietryk et al. | 415/152 A |

Primary Examiner—W. Gary Jones
Assistant Examiner—Mathew O. Savage
Attorney, Agent, or Firm—Limbach & Limbach

[57] ABSTRACT

A rotary multi-port valve assembly is disclosed. The valve is made up of a valve body having a central bore and three peripheral openings substantially equidistant of the center; and a rotor rotatably mounted within the bore of said valve body, said rotor having a platter with a center and three peripheral through-holes, such that two through-holes are aligned with two openings of the valve body when the valve is assembled. The rotor is rotatable through 90° to obtain two fluid control positions. The rotary valve is ideally adapted for use within a filtration system.

9 Claims, 3 Drawing Sheets

ROTARY MULTI-PORT PLATTER VALVE AND FILTER ASSEMBLY

TECHNICAL FIELD

The present invention relates generally to rotary multi-port valves and more particularly to rotary multi-port valves for use in water filters.

BACKGROUND OF THE INVENTION

Domestic installation of swimming pools and spas has increased dramatically over the past several years. However, the use of pools and spas in which water is continually reused requires the use of treatments and filters to maintain both health and aesthetic appeal. Standard spas and swimming pools employ a bi-directional flow system for circulating and filtering water. In standard operation, a pump is used to move water in a given direction through a filter where particulate matter and other unwanted debris is removed. Over time, the filter builds up an excessive accumulation of waste matter thereby impairing its effectiveness as a filter. In order to clear the filter of such debris, water flow through the filter is reversed to dislodge the matter and eliminate it from the system, a process known as backwashing. Known filter systems tend to be disadvantageous in that they require involved assembly and disassembly in order to effect filter changes.

Reversal of water flow is generally accomplished by means of a valve that can be adjusted to provide different flow directions. The rotary valve is an example of one valve type that has been used to achieve reversible flows. Examples of rotary valves are disclosed in U.S. Pat. Nos. 37,786; 3,590,872; 4,371,003; Re 24,055; and Re 30,224. Generally speaking, prior art rotary valves are complicated constructions that are expensive and time-consuming to produce. The rotor is frequently imbedded within the valve body, requiring disassembling of the valve to effect repair. Further, known rotary valves require complicated sealing means to guard against leaks and loss of pressure.

There is a need therefore for a rotary valve within a filter system that can be easily and quickly accessed for removing and replacing filters. There is an additional need for a rotary valve which is simply constructed and easily accessible for efficient repair and replacement. Finally there is a need for a rotary valve that does not require complex or expensive sealing means.

SUMMARY OF THE INVENTION

The present invention meets the foregoing needs by providing a simple rotary valve for reversing water flow within a filter or other pump-based system. The rotary valve of the present invention comprises a valve body having a central bore. The upper surface of the valve body is provided with a first peripheral opening, a second peripheral opening and a third peripheral opening equidistant from the bore, with the first and second peripheral openings positioned substantially opposite each other relative to the bore hole and the third peripheral opening positioned substantially at a right angle relative to the center and the first and second peripheral openings. Each of the peripheral openings is connected to a flow pipe. The valve further comprises a rotor rotatably mounted within the bore hole of said valve body. The rotor comprises a platter having a center and a first peripheral through-hole, a second peripheral through-hole and a third peripheral though-hole positioned equidistant of the center of the platter, with the first and second through-holes positioned substantially opposite each other relative to the center and with the third through-hole positioned substantially at a right angle relative to the center and the first and second through-holes. The rotor further comprises a cap joined to said platter, said cap forming a conduit that interconnects the first and third through-holes, said cap further provided with an apical port in communication with the conduit and positioned substantially above the center of said platter. Once the rotor is mounted on the valve body, the rotor can be rotated between one of two positions to achieve reversible flow as is described in greater detail below.

Of course, it will be apparent to one skilled in the art that the rotary valve described and claimed herein can be used in any construction where simple and efficient control of fluid flow is desired. The present invention also provides an improved filtering system incorporating the novel rotary valve described above.

An advantage of the valve of the present invention is that it permits the altering of fluid flow without complicated adjustments. A further advantage of the present invention is its simplicity of construction and ease of repair. Still another advantage of the present invention is the fact that it requires no complicated sealing means. These and further advantages will become apparent to one skilled in the art after review of the detailed description and drawings of the invention set forth below.

DETAILED DESCRIPTION OF THE PREFERRED EMBODIMENTS

Figure 1:
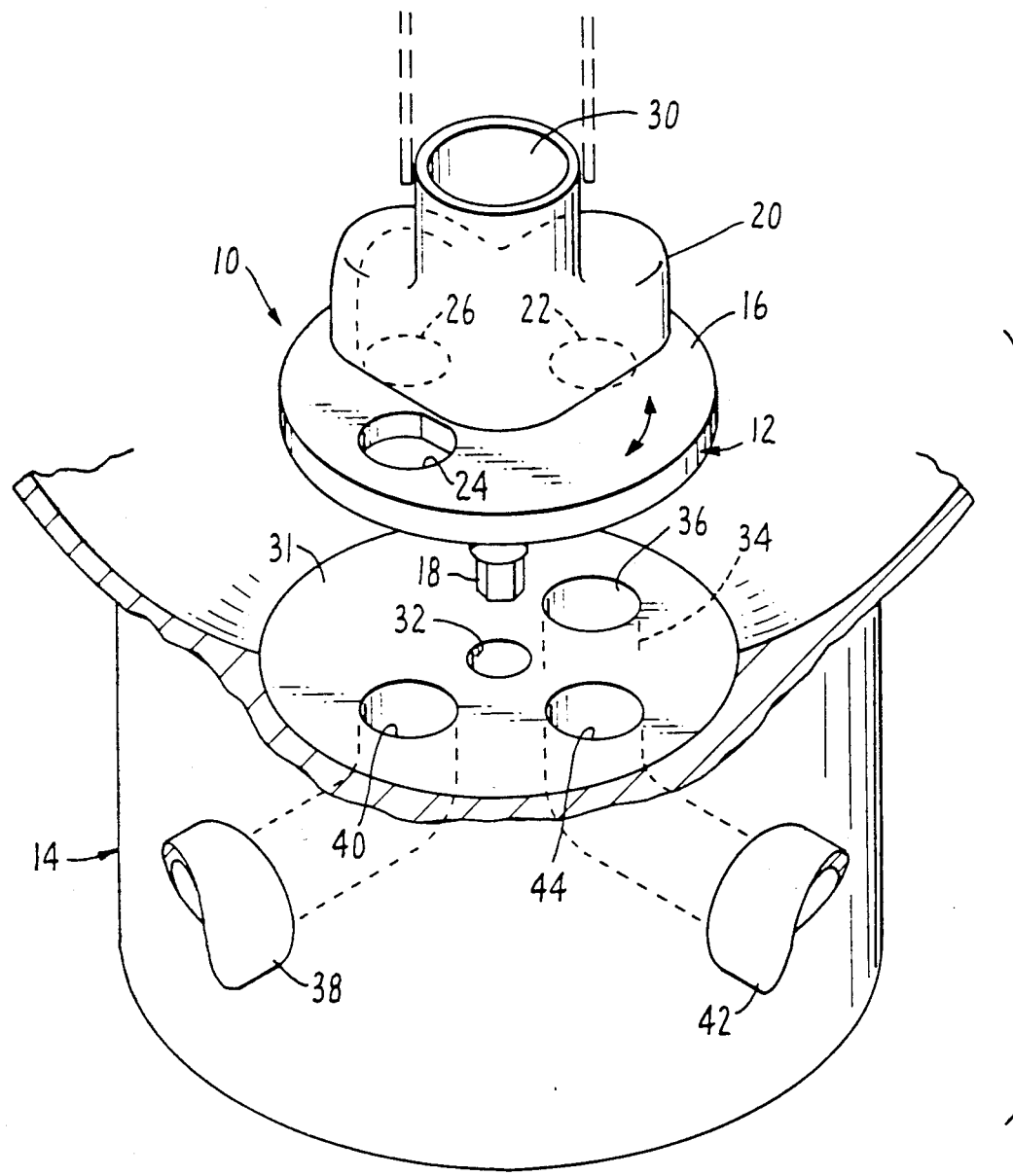
FIG. 1 is a view in perspective with broken away parts of a filter system incorporating the rotary valve of the present invention.
Figure 2:
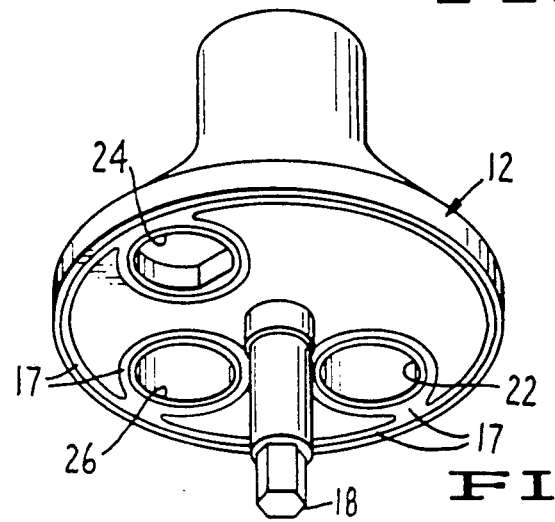
FIG. 2 is a view in perspective of the rotor of the present invention.

FIGS. 1 and 2 show a rotary valve 10 in accordance with the present invention. Rotary valve 10 comprises a rotor 12 and a valve body 14. Rotor 12 comprises a platter 16, which is provided with a first through-hole 22, a second through-hole 24 and a third through-hole 26, and further comprises, a post 18 joined to the center of the lower surface of the platter and a cap 20 joined to the upper surface of the platter. The through-holes are positioned along the periphery of the platter, substantially equidistant of the center, with the first and third through-holes opposite the center and the second through-hole positioned at a right angle relative to the line described by the first and third through-holes. Platter 16 is further provided with a gasket 17 on the underside of the platter and proximate to the edge of the platter and the three through-holes.

Cap 20 is internally hollow and is positioned over the first and third through-holes so as to form a conduit 28 between the two through-holes. Cap 20 is further provided with an apical port 30 which communicates with conduit 28.

Valve body 14 is provided with an upper surface 31 having a bore 32 positioned substantially at its center. The bore is configured in diameter and depth for receipt of post 18 of rotor 12. Valve body 14 is further provided with a first channel 34 ending in a first peripheral opening 36, a second channel 38 ending in a second opening 40, and a third channel 42 ending in a third opening 44. Rotary valve 10 is assembled by inserting post 18 into bore 32 of Valve body 14. The post is secured to a selector means 19 to provide a snug fit of gasket 17 on the upper surface 31 of the valve body, and to allow the rotor to be rotated relative to the valve body at a point that is exterior to the rotary valve.

Rotor 12 can be composed of any suitable material but is preferably of form-molded polymer plastic. Valve body 14 similarly can be composed of any suitable material capable of withstanding the hydrostatic pressures under which the valve will be used, such as a polymer plastic, brass or stainless steel.

Figure 4:
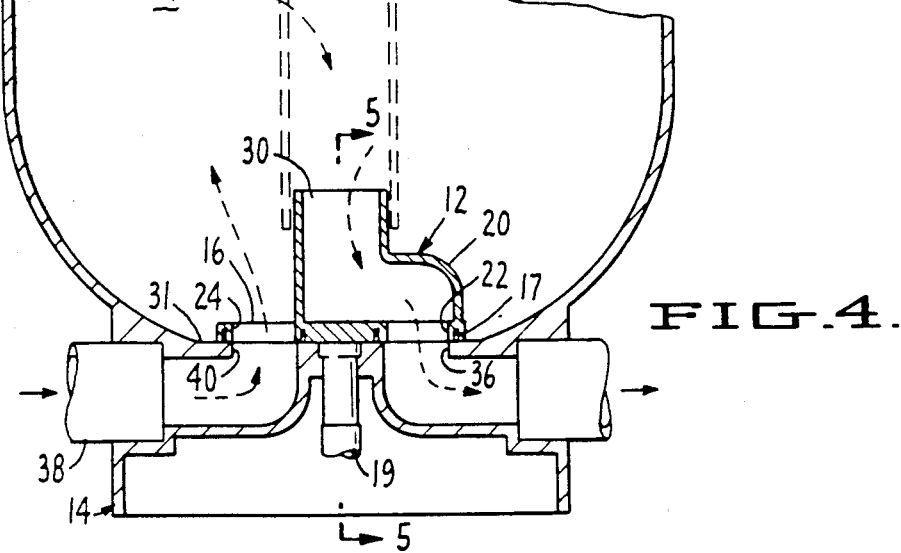
FIG. 4 is a view in cross section of a filter system incorporating the rotary valve of the present invention along line 4—4 of FIG. 3.
Figure 7:
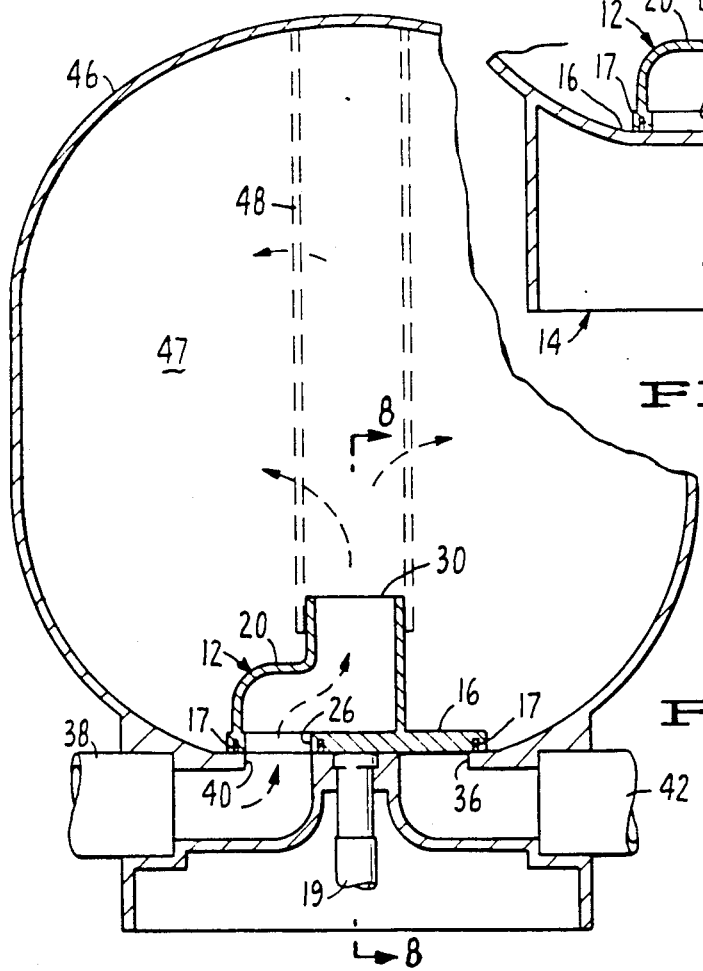
FIG. 7 is a view in cross section of a filter system incorporating the valve of the present invention along line 7—7 of FIG. 6.

The rotary valve of the present invention can be advantageously incorporated into a filter, as shown in cross section in FIGS. 4 and 7. The filter is comprised of the rotary valve 10 and a filter housing 46 forming a filter chamber 47. Filter 48 is received over port 30 of rotor 12. The housing may be composed of plastic, metal or other suitable material. The filters compatible with this invention are well known to those skilled in the art of filter manufacture.

Figure 3:
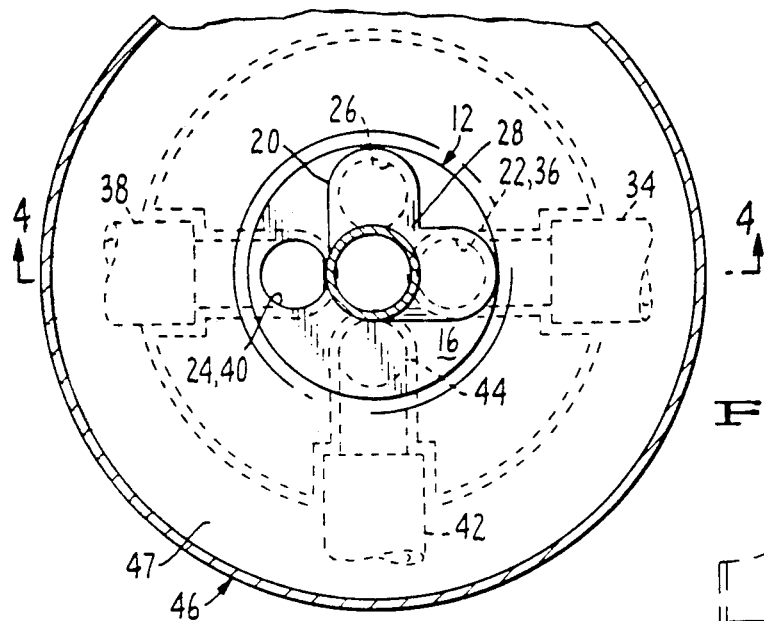
FIG. 3 is a top view of a filter system incorporating the rotary valve of the present invention in filtering position.
Figure 5:
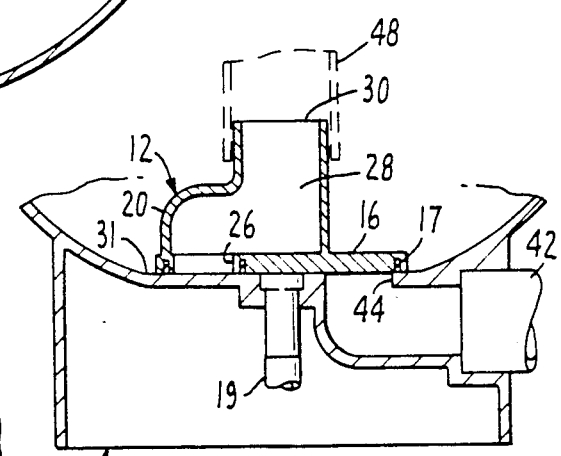
FIG. 5 is a view in cross section of a filter system incorporating the rotary valve of the present invention along line 5—5 of FIG. 4.

FIGS. 3 through 8 show how the rotor 12 can be rotated 90° about an axis defined by post 18 to obtain two fluid flow control positions. In FIGS. 3-5, rotor 12 is rotated into filter position. In the filtering position, through-holes 22 and 24 of the rotor are aligned respectively with openings 36 and 40. It should be noted that in this position through-hole 26 and opening 44 are blocked to fluid flow. Filtering is accomplished as water flowing through pipe 38 exits opening 40 and passes through through-hole 24, thereby entering chamber 47. Hydrostatic pressure from continued water flow into chamber 47 forces the water through filter 48, then down through portal 30, conduit 28, through-hole 22, through-hole 36 and thence outward through pipe 34.

Figure 6:
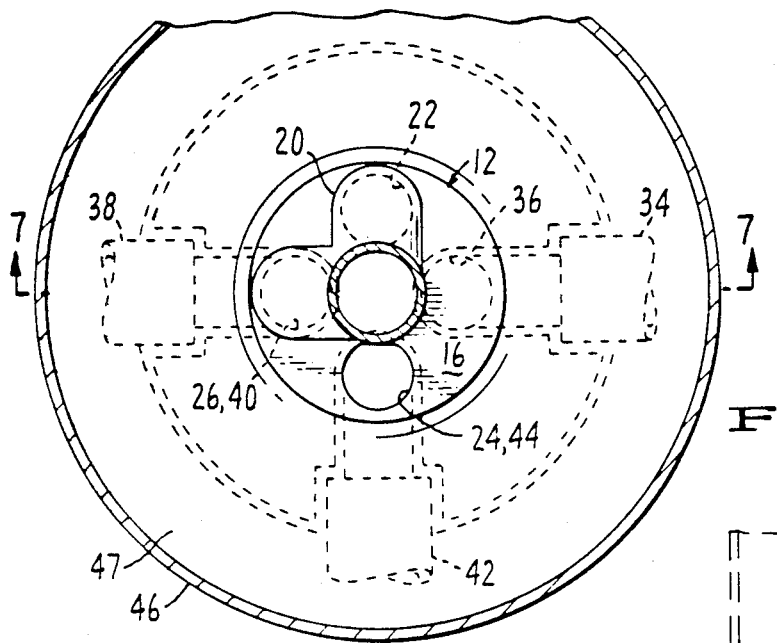
FIG. 6 is a top view of a filter system incorporating the rotary valve of the present invention in backwash position.
Figure 8:
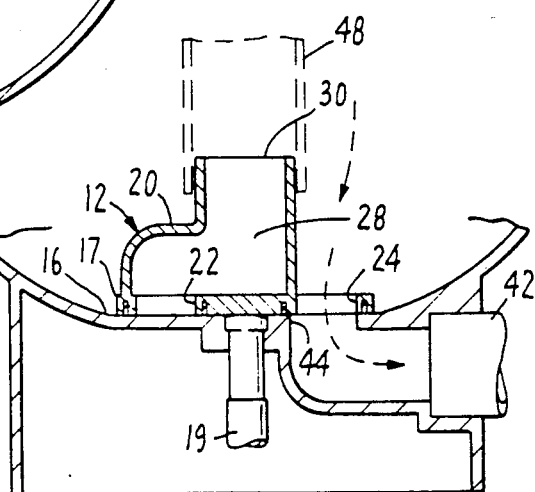
FIG. 8 is a view in cross section of a filter system incorporating the valve of the present invention along line 8—8 of FIG. 7.

Backwash alignment of the rotary valve of the present invention is accomplished by rotating the rotor 90° relative to its filtering position as shown in FIGS. 6-8. In the backwash position, through-holes 26 and 24 of the rotor are aligned respectively with openings 40 and 44. It should be noted that in this position through-hole 22 and opening 36 are blocked to fluid flow. Backwash is accomplished as water flowing through pipe 38 exits opening 40 and passes through through-hole 26, thereby the interior of filter 48. Hydrostatic pressure from continued water flow into filter 48 forces the water through the filter into filter chamber 47, thereby dislodging accumulated filtrate. The water-filtrate solution then passes down through through-hole 24, opening 44, and thence outward through pipe 42.

It is clear from the foregoing description that a new and useful rotary valve has been discovered. One skilled in the art will understand however that the description is merely explanatory and illustrative of certain embodiments of the invention. It is contemplated that numerous variations on the embodiments described above may be within the scope of the invention as defined by the claims below and by the equivalents thereof.

I claim:

1. A rotor for use in a multiport valve assembly of a filter system, said rotor comprising:
   (a) a platter having opposite sides, a periphery and a center, said platter being provided with first, second and third through holes located adjacent the periphery thereof and opening through said opposite sides, the first and second through-holes positioned substantially opposite each other relative to the center, the third through-hole positioned substantially at a right angle relative to the center and the first and second through-holes; and
   (b) a cap joined to one side of said platter, sad cap forming a conduit that interconnects the first and third through-holes, said cap further provided with an apical port extending therethrough and into communication with the conduit formed thereby, said port positioned substantially above the center of said platter.

2. The rotor of claim 1 further comprising a post joined to the center of said platter on the side thereof opposite that joined to said cap.

3. The rotor of claim 2 further comprising seal means positioned on the side of the platter opposite that joined to the cap to provide for sealing of the platter against an opposed surface.

4. The rotor of claim 3 wherein said seal means comprises gaskets extending around the periphery of said platter and the first, second and third through-holes.

5. A rotary multi-port valve comprising:
   (a) a valve body having a flat surface with a central bore formed therein, said body being provided with first, second and third openings extending through the flat surface thereof, the first and second openings positioned substantially opposite each other relative tot he bore and the third opening positioned substantially at a right angle relative to the bore and the first and second openings;
   (b) a rotor rotatably mounted to the bore of said valve body, said rotor comprising:
      a platter having opposite sides, a periphery, a center and first, second and third through-holes opening through said opposite sides, the first and second through-holes positioned substantially opposite each other relative to the center, the third through-hole positioned substantially at a right angle relative to the center and the first and second through-holes;
      a cap joined to one side of said platter, said cap forming a conduit that interconnects the first and third through-holes, said cap further provided with an apical port extending therethrough and into communication with the conduit formed thereby, said port positioned substantially above the center of said platter;
      a post joined to the center of said platter on the side thereof opposite that joined to said cap, said post being received by the bore of said valve body; and (c) seal means positioned on the platter of said rotor, said seal means extending around the through-holes of the platter and projecting toward and forming a seal with said valve body.

6. The valve of claim 5 further comprising selector means connected to the rotor for shifting position of said rotor relative to said valve body so that two of the through-holes of said rotor can be aligned with two of the three openings of said valve body to achieve a desired direction of flow through the valve.

7. The rotary valve of claim 6 wherein said seal means comprises gaskets extending around the periphery of said platter and the first, second and third through-holes.

8. A water filter for use with a pool or spa comprising:
- (a) filter means for removing particulate and other undesirable matter form water;
- (b) a rotary multi-port valve assembly comprising:
  a valve body having a flat surface with a central bore formed therein, said body being provided with first, second and third openings extending through the flat surface thereof, the first and second openings positioned substantially opposite each other relative to the bore and the third opening positioned substantially at a right angle relative to the bore and the first and second openings;
  a rotor rotatably mounted to the bore of said valve body, said rotor provided with a platter having opposite sides, a periphery, a center and first, second and third through-holes opening through said opposite sides, the first and second through-holes positioned substantially opposite each other relative to the center, the third through-hole positioned substantially at a right angle relative tot he center and the first and second through-holes, and further provided with a cap joined to one side of said platter, said cap forming a conduit that interconnects the first and third through-holes, said cap further provided with an apical port extending therethrough and into communication with the conduit formed thereby, said port positioned substantially above the center of said platter, and a post joined to the center of said platter on the side thereof opposite that joined to said cap, said post being received by the bore of said valve body;
  seal means positioned on the platter of said rotor, said seal means extending around the through-holes of the platter and projecting toward and forming a seal with said valve body;
- (c) a housing surrounding said filter means and joined with said multi-port valve assembly; and
- (d) selector means connected to the rotor for shifting position of said rotor relative to said valve body so that two of the through-holes of said rotor can be aligned with tow of the three openings of said valve body to achieve a desired direction of flow through the filter system.

9. The rotary valve of claim 8 wherein said seal means comprises gaskets extending around the periphery of said platter and the first, second and third through-holes.

* * * * *